J. G. CHERRY.
Can for Transporting Milk or Cream.
No. 222,814.      Patented Dec. 23, 1879.
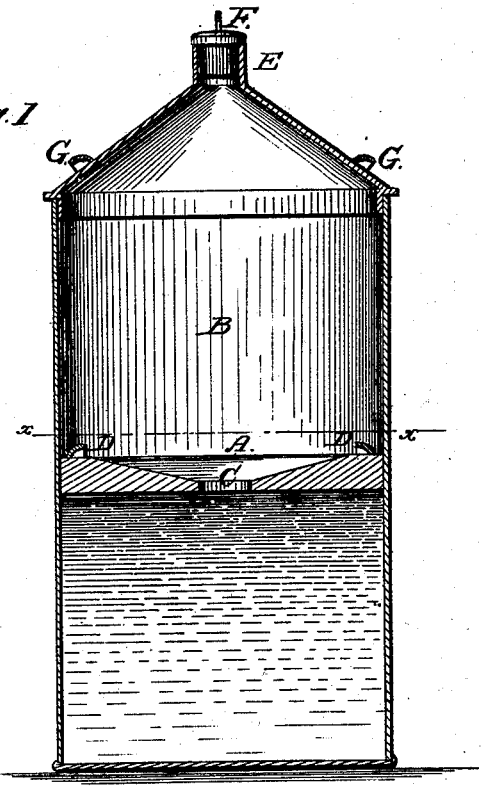
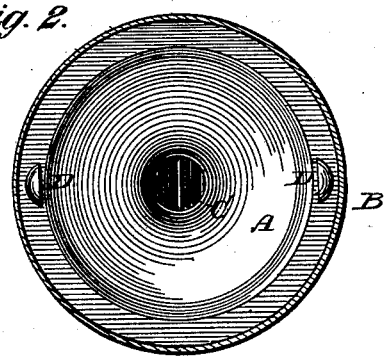
Witnesses
Fred G. Dieterich
Reuben Perrine
Inventor
John G. Cherry
By Parker H. Sweet Jr.
Atty.

UNITED STATES PATENT OFFICE.

JOHN G. CHERRY, OF CEDAR RAPIDS, IOWA.

IMPROVEMENT IN CANS FOR TRANSPORTING MILK OR CREAM.

Specification forming part of Letters Patent No. 222,814, dated December 23, 1879; application filed October 2, 1879.

*To all whom it may concern:*

Be it known that I, JOHN G. CHERRY, of Cedar Rapids, in the county of Linn and State of Iowa, have invented certain new and useful Improvements in Cans for Transporting Milk or Cream; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in that class of cans for transporting milk or cream which have for their object to provide suitable means for preventing the overflow or spilling of the contents while being transported from one place to another; and it consists in the details of construction and general arrangement of parts, all as will be hereinafter fully described, and pointed out in the claims.

Referring to the drawings, Figure 1 is a vertical longitudinal section of my improvements, and Fig. 2 is a transverse section taken on the line $x\,x$ of Fig. 1.

Similar letters of reference occurring on the several figures indicate like parts.

B represents the body of a milk-can of the usual construction, which I provide with a raised top or cover, having a central opening or orifice, E. Within the can and smoothly adjusted therein I provide a light wooden or metallic float, A, the top of which is concave, and having a central opening, C, extending through the same.

D D represent suitable handles for removing the float from the can when it is desired to clean the same.

The construction of my invention being as described, it will be observed that in the operation of the same the milk or cream is poured through the opening E of the raised cover down upon the float A, from whence it finds its way through the opening C in the float to the bottom of the can, causing said float to rise in the can to a height proportionate to the amount of milk or cream contained in the can.

In the transportation of milk or cream from one place to another the float A, resting lightly upon the surface of the contents of the can, prevents the splashing or flowing over of the milk or cream by reason of the contents gushing up through the central opening, C, upon the concaved top, from whence it returns again to the under surface of the float through the same opening, and as the contents of the can rise and fall through the float A, the animal heat contained in the cream or milk is given off and passes out through the opening E in the cover of the can, enabling the contents of the cans to be delivered at their destination in good condition.

Having thus described my invention, what I claim as new and useful is—

1. The herein-described can for transporting milk or cream, consisting of the body B, having raised cover, provided with central opening, E, and float A, having concave top provided with handles D and central opening, C, substantially as and for the purpose specified.

2. The combination of the float A, having concave top, provided with handles D and central opening, C, with the can B, and raised cover having central opening, E, substantially as and for the purpose specified.

J. G. CHERRY.

Witnesses:
R. H. MORIN,
H. C. MORIN.